United States Patent
Sano

(10) Patent No.: US 6,302,420 B1
(45) Date of Patent: Oct. 16, 2001

(54) DOUBLE WISHBONE SUSPENSION

(75) Inventor: Tetsuji Sano, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/655,724

(22) Filed: Sep. 5, 2000

(30) Foreign Application Priority Data

Sep. 7, 1999 (JP) .................................. 11-252689

(51) Int. Cl.[7] ........................................ B60G 3/06
(52) U.S. Cl. .................. 280/124.134; 280/124.125; 280/124.135; 280/124.143
(58) Field of Search ............. 280/124.134, 124.125, 280/124.135, 124.136, 124.139, 124.143, 124.15, FOR 110

(56) References Cited

U.S. PATENT DOCUMENTS

| | | |
|---|---|---|
| 4,822,073 * | 4/1989 | Tanahashi et al. . |
| 4,828,279 | 5/1989 | Matschinsky . |
| 5,380,024 | 1/1995 | Hayami . |
| 6,099,005 * | 8/2000 | Wakatsuki . |

FOREIGN PATENT DOCUMENTS 06344737A   12/1994   (JP) .

* cited by examiner

*Primary Examiner*—Eric Culbreth
(74) *Attorney, Agent, or Firm*—Finnegan, Henderson, Farabow, Garrett & Dunner, L.L.P.

(57) ABSTRACT

A double wishbone suspension has a carrier, an upper-arm, a lower arm, a lateral link, and a connecting part, etc. The carrier supports a wheel of a vehicle. An inside end of the upper-arm is coupled to a frame of the vehicle, and an outside end of the upper-arm is coupled to a lower end of the carrier. Two inside ends of the lower-arm are coupled to the frame of the vehicle, and an outside end of the lower-arm is coupled to a lower end of the carrier. Two inside ends are separated in the front-rear direction of the vehicle. An inside end of the lateral link is coupled to the frame of the vehicle, and an outside end of the lateral link is coupled to the carrier at a point offset from the axis of the wheel in the front-rear direction of the vehicle. The connecting part is between the carrier and the lower-arm so that the carrier can move in the front-rear direction of the vehicle relatively to the lower-arm. The connecting part includes two rigid parts and a rubber bush. The rubber bush is between the two rigid parts, and the rubber bush is elastically deformable. Since the structure of this suspension is simple, a cost of the suspension is low and a reliability of the suspension is high. Furthermore, the suspension can be adopted to a vehicle having a four-wheel-steering mechanism.

17 Claims, 3 Drawing Sheets

DOUBLE WISHBONE SUSPENSION

FIELD OF THE INVENTION

The present invention relates to a suspension for a vehicle, especially a double wishbone suspension.

BACKGROUND OF THE INVENTION

One example of a double wishbone suspension for a vehicle is shown in Japanese Laid-Open Patent Application No. 6-344737. A suspension for a vehicle comprises a carrier, an upper-arm, a lower arm, a lateral link, and a connecting part. The carrier supports a wheel of the vehicle so that the wheel can rotate on an axis of the wheel. The upper-arm is provided in the transverse direction of the vehicle. An inside end of the upper-arm is coupled to a frame of the vehicle, and an outside end of the upper-arm is coupled to an upper end of the carrier, so that the upper-arm can vertically oscillate. The lower-arm is coupled to the frame of the vehicle on two inside ends of the lower-arm, and the two inside ends are separated in the front-rear direction of the vehicle, so that the lower-arm can vertically oscillate. The lateral link (also called toe control rod) is coupled to the frame of the vehicle on an inside end of the lateral link and coupled to the carrier at a point offset from the axis of the wheel in the front-rear direction of the vehicle. A connecting part is between the carrier and the lower-arm so that the carrier can move in the front-rear direction of the vehicle relative to the upper-arm and the lower-arm.

It is advantageous that a good rigidity supporting the wheel can be obtained by the above-mentioned double wishbone suspension. Furthermore, the suspension can be adopted to the vehicle having a four-wheel-steering mechanism without any modification.

However, the connecting part comprises an inner pipe and an outer pipe. The inner pipe is coupled to the lower arm via an intermediate shaft and a supporting shaft on an end of the inner pipe, so that the inner pipe can oscillate in the transverse direction of the vehicle. The outer pipe is connected to the inner pipe on one side, so that the outer pipe can reciprocate in the direction of an axis of the inner and outer pipes. That is, the inner pipe is telescopic to the outer pipe. The outer pipe is coupled to the carrier on the other side by way of a ball joint. As mentioned above, a structure of the connecting part is complicated. Then, a cost of the suspension is rather high, and it is desirable that a reliability of the suspension is improved.

SUMMARY OF THE INVENTION

It is thus one object of the present invention to solve the aforementioned problems. That is, the object of the invention is to provide a double wishbone suspension for a vehicle.

A double wishbone suspension comprises a carrier, an upper-arm, a lower-arm, a lateral link, and a connecting part. The carrier supports a wheel of a vehicle, so that the wheel can rotate on an axis. An inside end of the upper-arm is coupled to a frame of the vehicle, and an outside end of the upper-arm is coupled to an upper end of the carrier, so that the upper-arm can vertically oscillate. Two separated inside ends of the lower-arm are coupled to the frame of the vehicle, and an outside end of the lower-arm is coupled to a lower end of the carrier. The two inside ends are separated in the front-rear direction of the vehicle. The lower-arm can vertically oscillate. An inside end of the lateral link is coupled to the frame of the vehicle, and an outside end of the lateral link is coupled to the carrier at a point offset from the axis of the wheel in the front-rear direction of the vehicle. The lateral link can vertically oscillate. A connecting part is between the carrier and the lower-arm so that the carrier can move in the front-rear direction of the vehicle relative to the lower-arm. The connecting part comprises two rigid parts and a rubber bush which is between the two rigid parts. The rubber bush is elastically deformable. The two rigid parts are inner and outer cylinders.

By this double wishbone suspension, the position of the inside end of the lateral link is maintained constant, and the lower-arm, the connecting part, and the lateral link collaborate to get a good rigidity for supporting the wheel, same as a known H-shaped lower-arm.

The structure of the suspension is simple because the connecting part consists of the two rigid parts and the rubber bush. Consequently, a cost of the suspension is low, and a reliability of the suspension is high.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

Figure 1:
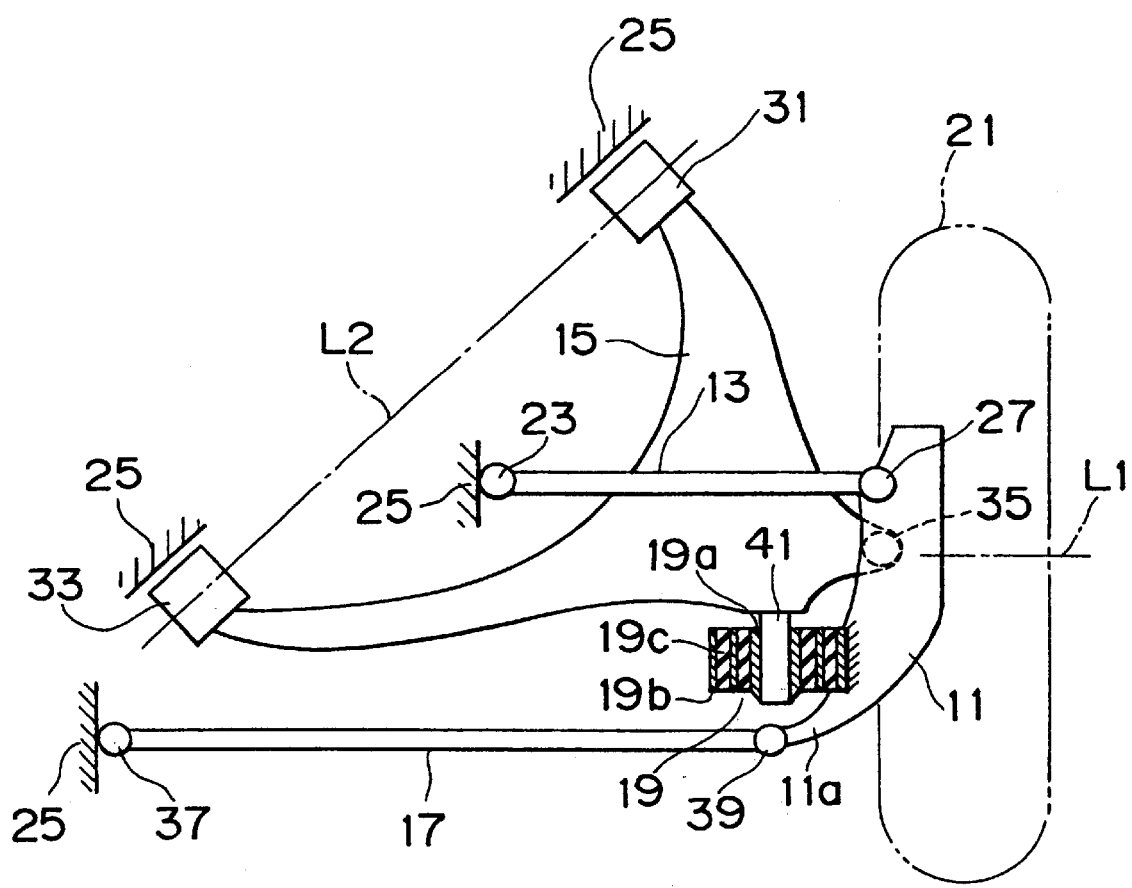
FIG. 1 is a schematic plan view of a double wishbone suspension as a first embodiment of the present invention.

In the following description and the accompanying drawings, the present invention will be described in more detail in terms of specific embodiments. First, a first embodiment of the present invention is explained, using FIGS. 1 and 2. One example of a double wishbone suspension shown in FIGS. 1 and 2 includes a carrier 11, an upper-arm 13, a lower-arm 15, a lateral link 17, a connecting part 19, a known shock-absorber (not shown in FIGS. 1 and 2), a known suspension spring (not shown in FIGS. 1 and 2), etc. The carrier 11, the upper-arm 13, the lower-arm 15, and the lateral link 17 are formed by substantially rigid parts.

The carrier 11 supports a wheel 21 so that the wheel 21 can rotate on the axis L1 of the wheel 21. The upper-arm 13 and the lower-arm 15 support the carrier 11. The upper-arm 13 is an I-shaped arm and substantially lies in the transverse direction of the vehicle. The upper-arm 13 is connected to a frame 25 of the vehicle via a joint 23 on an inside end of the upper-arm 13. The upper-arm 13 is also connected to an upper end of the carrier 11 via a ball-joint 27 on an outside end of the upper-arm 13. By this structure, the upper-arm 13 can vertically oscillate.

The lower-arm 15 is a substantially A-shaped arm. Two inside ends are separated in the substantially front-rear and transverse directions of the vehicle. The lower-arm 15 is connected to the frame 25 of the vehicle by way of joints 31 and 33, so that the lower-arm 15 can oscillate on the axis L2. Incidentally, the axis L2 coincides not only to an axis of the joint 31, but also to an axis of the joint 33. The lower-arm 15 is also connected to a lower end of the carrier 11 on an outside end of the lower-arm 15. The front joint 31 is positioned in forward (the upper side in FIG. 1) and outboard of the vehicle relative to the rear joint 33. The rear joint 33 and a ball joint 35 are positioned nearly the same distance from the front of the vehicle.

The lateral link 17 is aligned in the substantially transverse direction and is located behind the lower-arm 15. The lateral link 17 is coupled to the frame 25 on an inside end of the lateral link 17 via a joint 37 which includes a rubber bush. The lateral link 17 is coupled to an arm portion 11a of the carrier 11 at a point offset from the axis L1 of the wheel 21 in the front-rear direction of the vehicle on an outside end of the lateral link 17. The lateral link 17 can vertically oscillate at a pivotal center of the joint 37.

The connecting part 19 includes an inner cylinder (also called inner pipe) 19a, an outer cylinder (also called outer pipe) 19b, and a rubber bush 19c. The inner and outer cylinders 19a and 19b are rigid parts. The inner cylinder 19a is coaxial to a bracket 41, which is included in the lower-arm 15 and lies in the substantially front-rear direction. The bracket 41, having a cylindrical shape, engages an inside surface of the inner cylinder 19a. The outer cylinder 19b is coupled to a base part of the arm portion 11a. The rubber bush 19c is between the inner cylinder 19a and the outer cylinder 19b. The rubber bush 19c can elastically deform. Hollow slits 19c1 and 19c2 are provided in the transverse direction of the vehicle (in FIG. 3 the left side and right side in the rubber bush 19c), so that spring constants of the rubber bush 19c in the front-rear and transverse directions of the rubber bush 19c are lower than a spring constant in the vertical direction of the rubber bush 19c.

Incidentally, a shape of the inner pipe or the outer pipe of the connecting part 19 is not limited to cylindrical. Other shapes, such as an oval shape or a polygon shape as a cross-sectional view are also available.

In the above-mentioned suspension of this embodiment, when the position of the inside end of the lateral link 17 (that is the position of the joint 37) is maintained at the constant position, the lower-arm 15 functions the same as a H-shaped lower-arm, collaborating with the lateral link 17 and the connecting part 19. Incidentally, the H-shaped lower-arm is not shown, but if the H-shaped lower-arm is drawn in FIG. 1, two inside ends are separated in the substantially front-rear and transverse directions, and the H-shaped lower-arm is connected to the frame 25 of the vehicle by way of the two joints 31, 33, so that the H-shaped lower-arm can oscillate on the axis L2. The H-shaped lower-arm is connected to the carrier 11 on two outside ends of the H-shaped lower-arm which are separated in the front-rear and transverse directions via the ball joints 35, 39.

Figure 2:
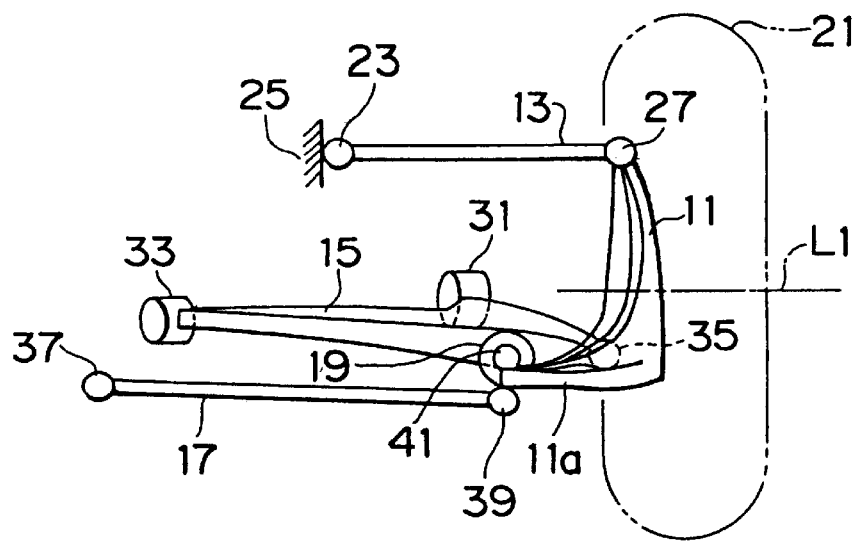
FIG. 2 is a schematic illustration of the suspension of the first embodiment from a rear viewpoint of a vehicle.
Figure 3:
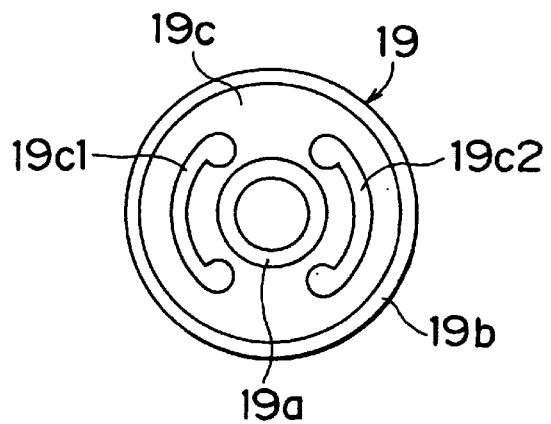
FIG. 3 is a cross-sectional view of a connecting part 19 shown in FIG. 1 which is cut by a vertical face facing a rear of the vehicle.

The lower arm 15 and the lateral link 17 receive a front-rear force from the wheel 21. The upper-arm 13, the lower-arm 15, and the lateral link 17 receive a lateral force from the wheel 21. Consequently, a good supporting rigidity, camber control performance, and toe control performance can be obtained, the same as the suspension which is shown in FIGS. 1, 2, and 3 in the above-mentioned Japanese Laid-Open Patent Application No. 6-344737.

Furthermore, in the suspension of this embodiment, if the inside end of the lateral link 17 (that is the point of the joint 37) moves in the transverse direction of the vehicle relative to the frame 25 by an actuator such as an oil cylinder, the carrier 11 moves relative to the lower-arm 15 and the upper-arm 13 in the front-rear direction on a kingpin axis of the vehicle from the upper viewpoint of the vehicle. The kingpin axis passes through the center point of the ball joint 35, which is located at the outside end of the lower-arm 15. Steering performance of the wheel 21 can, then, be achieved. If a steering tie rod replaces the lateral link 17, this suspension can be adopted to a rear wheel of a vehicle having a four wheel steering mechanism without any modification.

In the suspension of this embodiment, the connecting part 19 comprises the inner cylinder 19a which is connected to the lower-arm 15, the outer cylinder 19b which is connected to the carrier 11, and the elastically deformable rubber bush 19c which is between the inner cylinder 19a and the outer cylinder 19b. Since the connecting part 19 is simple, the cost of the connecting part 19 is low, and the reliability of the connecting part 19 is high.

Moreover, since the spring constants of the rubber bush 19c in the front-rear and transverse directions are lower than the spring constant of the rubber bush 19c in the vertical direction, the suspension has enough rigidity against a moment (that is, braking torque) inputted around the axis of rotation L1 of the wheel 21, and the suspension can control a change of steering as far as possible by the function of the lateral link 17. Consequently, a good characteristic of the steering can be obtained. Incidentally, the above-mentioned change of steering indicates that a steering system is effected by an external force to the wheel 21, and that an angle of the wheel 21 changes, when the wheel 21 moves up-and-down, because of a rough road, or when a force is loaded to the wheel 21 from outside ex. a road surface, etc.

Figure 4:
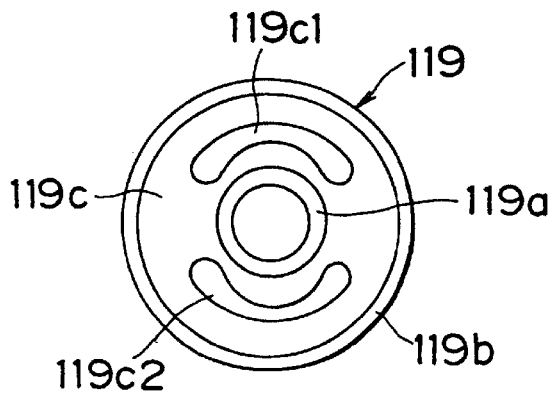
FIG. 4 is another example of a connecting part 119 for the first embodiment.

In the aforementioned embodiment, the spring constants of the rubber bush 19c in the front-rear and transverse directions are lower than the spring constant of the rubber bush 19c in the vertical direction. It is, however, not limited to this. It is also available that the spring constant of the rubber bush 119c in the front-rear and vertical directions are lower than the spring constant of the rubber bush 119c in the transverse direction, as shown in FIG. 4. In FIG. 4a connecting part 119 includes an inner cylinder 119a, an outer cylinder 119b, and a rubber bush 119c. The rubber bush 119c has two hollow slits 119c1 (upper side) and 119c2 (lower side). Since there is no hollow slit in the left and right sides, as shown in FIG. 4, the spring constant of the rubber bush 1 19c in the transverse direction is higher than the spring constant of the rubber bush 119c in the vertical direction.

It is not limited to the above-mentioned examples. It is also available that hollow slits are not provided in the rubber bush 19c. In this case, a spring constant of the rubber bush in the vertical direction of the vehicle is substantially equal to a spring constant of the rubber bush in the transverse direction of the vehicle.

Figure 5:
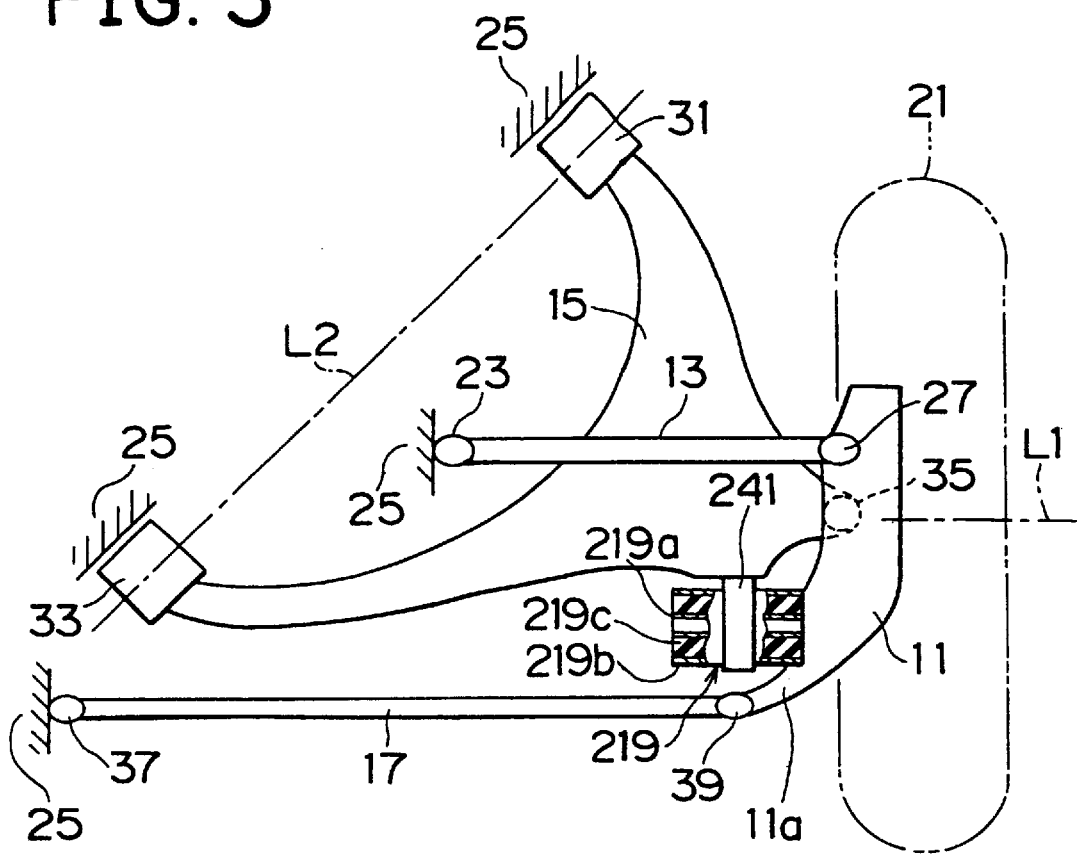
FIG. 5 is a schematic plan view of a double wishbone suspension as a second embodiment of the present invitation.
Figure 6:
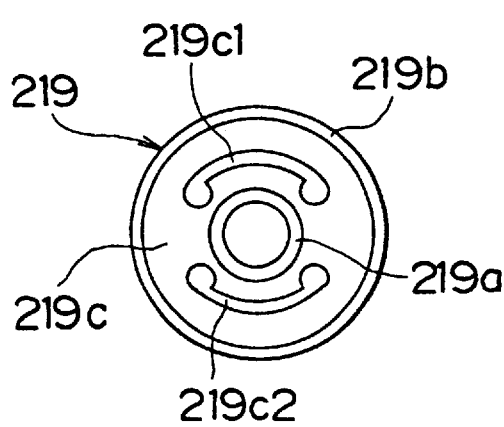
FIG. 6 is a cross-sectional view of a connecting part 219 shown in FIG. 5 which is cut by a vertical face facing a side of the vehicle.

Next, a second embodiment of the suspension is described, using FIGS. 5 and 6. In the second embodiment, a connecting part 219 is included. Other parts of the suspension of the second embodiment, such as the upper-arm, the lower-arm, the lateral link, etc are basically the same as in the first embodiment. In the following explanation, the difference is described.

The connecting part 219 includes an inner cylinder 219a, an outer cylinder 219b, and a rubber bush 219c. The inner and outer cylinders 219a and 219b are rigid parts. An axis of the outer cylinder 219b is coaxial to an axis of a bracket 241 which is included in the lower-arm 15. The outer cylinder 219b is inserted into the bracket 241. The rubber bush 219c is between the inner cylinder 219a and the outer cylinder 219b, and the rubber bush 219c can elastically deform.

FIG. 6 shows a cross-sectional view of the connecting part 219 which is cut by a vertical plane facing a side of the vehicle. As shown in FIG. 6, hollow slits 219c 1 and 219c 2 are provided in the upper and lower sides. Consequently, spring constants of the rubber bush 219c in the vertical and transverse directions of the rubber bush 219c are lower than a spring constant in the front-rear direction of the rubber bush 219c.

In the second embodiment, the inner cylinder 219a is coupled to the carrier 11 and the outer cylinder 219b is coupled to the lower-arm 15. Spring constants of the rubber bush 219c in the front-rear, vertical, and transverse directions of the vehicle, can thus have different characteristic than the rubber bush 19c of the first embodiment.

Figure 7:
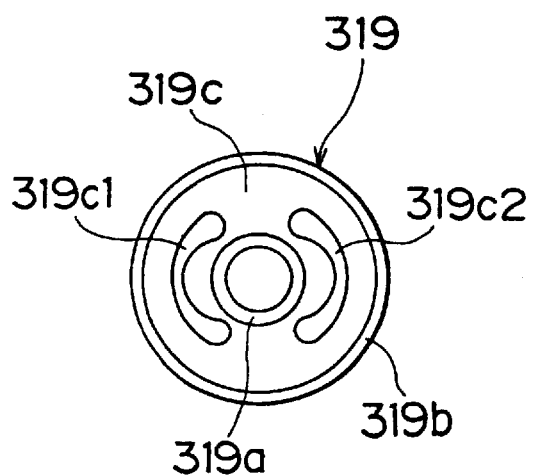
FIG. 7 is another example of a connecting part 319 for the second embodiment.

As another example of connecting parts, a connecting part 319 is shown in FIG. 7. A structure of the connecting part 319 is basically the same as the above-mentioned connecting part 219. The connecting part 319 consists of an inner cylinder 319a, an outer cylinder 319b, and a rubber bush 319c. The difference from the connecting part 219 is that hollow slits 319c 1, 319c 2 are provided in the front and rear sides of an inner cylinder 319a in the front-rear direction of the vehicle.

It is not limited to these examples. It is also available that hollow slits are not provided in the rubber bush 219c or 319c. In this case, a spring constant of the rubber bush in the vertical direction of the vehicle is substantially equal to a spring constant of the rubber bush in the front-rear direction of the vehicle.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A double wishbone suspension comprising:
   a carrier for supporting a wheel so that the wheel is able to rotate on an axis;
   an upper-arm having an inside end coupled to a frame of a vehicle and an outside end coupled to an upper end of the carrier, the upper-arm being able to vertically oscillate;
   a lower-arm having two inside ends coupled to the frame of the vehicle and an outside end coupled to a lower end of the carrier, the two inside ends being separated in the front-rear direction of the vehicle, the lower-arm being able to vertically oscillate;
   a lateral link having an inside end coupled to the frame of the vehicle and an outside end coupled to the carrier at a point offset from the axis of the wheel in the front-rear direction of the vehicle, the lateral link being able to vertically oscillate; and
   a connecting part between the carrier and the lower-arm so that the carrier is able to move in the front-rear direction of the vehicle relative to the lower-arm, the connecting part comprising:
   two rigid parts, and
   a rubber bush between the two rigid parts, the rubber bush being elastically deformable.

2. The double wishbone suspension as set forth in claim 1, wherein one of the two rigid parts is cylindrical, disposed on a first side of said rubber bush, and coupled to the carrier and wherein the other of the two rigid parts is cylindrical, disposed on a second side of said rubber bush, and coupled to the lower-arm.

3. The double wishbone suspension as set forth in claim 2, wherein a spring constant of the rubber bush in the transverse direction of the vehicle is substantially equal to a spring constant of the rubber bush in the vertical direction of the vehicle.

4. The double wishbone suspension as set forth in claim 2, wherein a spring constant of the rubber bush in the transverse direction of the vehicle is lower than a spring constant of the rubber bush in the vertical direction of the vehicle.

5. The double wishbone suspension as set forth in claim 4, wherein spring constants of the rubber bush in the transverse and front-rear directions of the vehicle are lower than a spring constant of the rubber bush in the vertical direction of the vehicle.

6. The double wishbone suspension as set forth in claim 4, wherein the rubber bush includes a hollow slit that does not intersect a vertical plane passing through the center of the rubber bush and extending in the front-rear direction of the vehicle.

7. The double wishbone suspension as set forth in claim 2, wherein a spring constant of the rubber bush in the vertical direction of the vehicle is lower than a spring constant of the rubber bush in the transverse direction of the vehicle.

8. The double wishbone suspension as set forth in claim 7, wherein spring constants of the rubber bush in the vertical and front-rear directions of the vehicle are lower than a spring constant of the rubber bush in the transverse direction of the vehicle.

9. The double wishbone suspension as set forth in claim 7, wherein the rubber bush includes a hollow slit that does not intersect a horizontal plane passing through the center of the rubber bush.

10. The double wishbone suspension as set forth in claim 1, wherein one of the two rigid parts is cylindrical, disposed on a first side of said rubber bush and coupled to the lower-arm and wherein the other of the two rigid parts is cylindrical, disposed on a second side of said rubber bush, and coupled to the carrier.

11. The double wishbone suspension as set forth in claim 10, wherein a spring constant of the rubber bush in the vertical direction of the vehicle is substantially equal to a spring constant of the rubber bush in the front-rear direction of the vehicle.

12. The double wishbone suspension as set forth in claim 10, wherein a spring constant of the rubber bush in the vertical direction of the vehicle is lower than a spring constant of the rubber bush in the front-rear direction of the vehicle.

13. The double wishbone suspension as set forth in claim 12, wherein spring constants of the rubber bush in the vertical and transverse directions of the vehicle are lower than a spring constant of the rubber bush in the front-rear direction of the vehicle.

14. The double wishbone suspension as set forth in claim 12, wherein the rubber bush includes a hollow slit that does not intersect a horizontal plane passing through the center of the rubber bush.

15. The double wishbone suspension as set forth in claim 10, wherein a spring constant of the rubber bush in the front-rear direction of the vehicle is lower than a spring constant of the rubber bush in the vertical direction of the vehicle.

16. The double wishbone suspension as set forth in claim 15, wherein spring constants of the rubber bush in the front-rear and transverse directions of the vehicle are lower than a spring constant of the rubber bush in the vertical direction of the vehicle.

17. The double wishbone suspension as set forth in claim 15, wherein the rubber bush includes a hollow slit that does not pass through a vertical plane passing through the center of the rubber bush and extending in the transverse direction of the vehicle.

* * * * *